(12) United States Patent
Vogt

(10) Patent No.: US 10,682,594 B2
(45) Date of Patent: Jun. 16, 2020

(54) FILTER ELEMENT AND FLUID FILTER

(71) Applicant: MANN+HUMMEL GmbH, Ludwigsburg (DE)

(72) Inventor: Christian Vogt, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/049,280

(22) Filed: Jul. 30, 2018

(65) Prior Publication Data

US 2018/0333661 A1 Nov. 22, 2018

Related U.S. Application Data

(63) Continuation of application No. PCT/EP2017/050636, filed on Jan. 13, 2017.

(30) Foreign Application Priority Data

Feb. 1, 2016 (DE) .......................... 10 2016 001 023

(51) Int. Cl.
*B01D 29/13* (2006.01)
*B01D 35/30* (2006.01)

(52) U.S. Cl.
CPC ............. *B01D 29/13* (2013.01); *B01D 35/30* (2013.01); *B01D 2201/347* (2013.01); *B01D 2201/4084* (2013.01)

(58) Field of Classification Search
CPC ..................... B01D 2201/291; B01D 2201/347
See application file for complete search history.

(56) References Cited

U.S. PATENT DOCUMENTS

| 2008/0047132 A1 | 2/2008 | Wieczorek |
| 2011/0089091 A1 | 4/2011 | Grass |
| 2014/0027366 A1* | 1/2014 | Hawkins ................ B01D 29/13 |
| | | 210/232 |
| 2014/0190880 A1 | 7/2014 | Krull |

FOREIGN PATENT DOCUMENTS

| DE | 102011088742 A1 | 6/2013 |
| WO | 2015036107 A1 | 3/2015 |

* cited by examiner

*Primary Examiner* — Benjamin M Kurtz
(74) *Attorney, Agent, or Firm* — James Hasselbeck

(57) ABSTRACT

A filter element for filtering fluid has a filter medium surrounding an inner cavity extending axially in the filter element. An axially extending sealing connecting piece is arranged at an axial end of the filter element. The sealing connecting piece has an opening fluidically connecting the inner cavity to a fluid channel of a filter housing and also has a seal holder structure. A double concentric seal is arranged at the sealing connecting piece and closes a drainage channel of the filter housing. The double concentric seal has radially inner and radially outer sealing elements. One of the sealing elements has an elastically deformable sealing lip that extends away from the sealing connecting piece radially and axially toward the filter medium and can be pressed against a sidewall of the drainage channel of the filter housing. The other sealing element is an oil seal arranged in the seal holder structure.

10 Claims, 2 Drawing Sheets

FILTER ELEMENT AND FLUID FILTER

CROSS-REFERENCE TO RELATED APPLICATIONS

This application is a continuation application of international application No. PCT/EP2017/050636 having an international filing date of 13 Jan. 2017 and designating the United States, the international application claiming a priority date of 1 Feb. 2016, based on prior filed German patent application No. 10 2016 001 023.1, the entire contents of the aforesaid international application and the aforesaid German patent application being incorporated herein by reference.

BACKGROUND OF THE INVENTION

The invention relates to a filter element and to a fluid filter for filtering a fluid, in particular fuel or oil, comprising a filter medium which surrounds an inner cavity extending along a filter element longitudinal axis, and one end of which comprises a sealing connecting piece comprising an opening for fluidically connecting the inner cavity to a fluid channel of a filter housing. The sealing connecting piece comprises a seal having a radially inner sealing element and a radially outer sealing element.

EP 2 070 575 A1 discloses an oil filter for a motor vehicle comprising a filter element, the filter medium of which surrounds an inner cavity extending along a filter element longitudinal axis. The bottom of the filter housing comprises a discharge or drainage channel for discharging the oil arranged in the filter housing, into which channel a sealing connecting piece of the filter element extends when the oil filter is in the operating state. The sealing connecting piece comprises a double concentric seal comprising a radially inner sealing element and an outer sealing element that are in sealing contact with the side walls of the drainage channel and thus close the drainage channel in a fluid-tight manner. In order to discharge the oil arranged in the filter housing, the filter element has to be moved in the axial direction out of the sealing seat thereof, such that the drainage channel is fluidically connected to an unfiltered side of the oil upstream of the filter medium and to a clean side downstream of the filter element.

Using the filter element in the filter housing is associated with a relatively high force requirement on account of the design of the double concentric seal. Moreover, the double concentric seal may swell due to long-term contact with the oil, with the result that it is often difficult to move the filter element out of the filter housing in order to replace the filter element.

The object of the invention is therefore that of specifying a filter element and a fluid filter which allow for simplified handling together with an improved sealing function of the seal arranged on the sealing connecting piece.

SUMMARY OF THE INVENTION

The object relating to the filter element is achieved by a filter element for filtering a fluid, in particular fuel or oil, comprising:
- a filter medium that surrounds an inner cavity extending in the direction of the longitudinal axis of the filter element;
- an axially extending sealing connecting piece that is arranged at one end of the filter element and comprises an opening for fluidically connecting the inner cavity to a fluid channel of a filter housing;
- a seal that is arranged on the sealing connecting piece and comprises a radial inner and a radially outer sealing element for closing a drainage channel of a filter housing;
- wherein the seal is designed as a double concentric seal, and wherein one of the two sealing elements comprises an elastically deformable sealing lip that extends away from the sealing connecting piece in the radial direction and axially toward the filter medium so as to be able to be pressed in a pressure-assisted manner against an associated side wall of the drainage channel,
- wherein the other of the two sealing elements, respectively, is formed as an oil seal that is held in a seal holder structure of the sealing connecting piece.

The object relating to the fluid filter is achieved by a fluid filter comprising a filter housing that has an inlet for the fluid to be filtered and an outlet for the filtered fluid, and comprising a filter element as disclosed above arranged in the filter housing, wherein the inner cavity of the filter element is fluidically connected to a fluid channel of the filter housing, and wherein the sealing connecting piece of the filter element extends in the axial direction into a housing-side drainage channel for discharging the fluid arranged in the filter housing, and closes the drainage channel in a fluid-tight manner by means of the seal.

The filter element according to the invention is characterized by simpler handing overall, in that one of the two sealing elements of the seal comprises a sealing lip that extends away from the sealing connecting piece in the radial direction, and the other of the two sealing elements, respectively, is formed as an oil seal. An oil seal is understood to be an annular sealing element without a sealing lip. The oil seal may equally comprise a sealing edge. The oil seal can ensure simplified guidance of the filter element on the filter housing when the filter element is inserted into the operating position thereof inside a filter housing of an oil filter or fuel filter. It is thus easy to orient the sealing connecting piece so as to be axially aligned with the drainage channel and to thread the sealing connecting piece therein. In this case, when the sealing connecting piece is introduced into the drainage channel of the filter housing, the elastically deformable sealing lip of the other sealing element, respectively, is deflected out of the neutral position thereof, i.e. the unstressed position thereof, in the radial direction relative to the sealing connecting piece, counter to the inherent elasticity of the material of the sealing lip, so as to come into contact with a side wall of the drainage channel. Manufacturing tolerances of the filter element and of a filter housing of a fuel filter or oil filter that is intended for receiving the filter element can be compensated for in this design of the seal.

Moreover, the sealing lip is designed so as to be pressed against the associated side wall by means of a contact pressure derived from the pressurization by means of the fluid, i.e. in a pressure-assisted manner. A further improved sealing function of the seal can be achieved thereby. In this case, the sealing lip of a sealing element extends away from the sealing connecting piece preferably in the axial direction toward the filter medium. As a result, the sealing lip can be applied to the associated side wall of the drainage channel in a pressure-assisted or pressure-proportional manner in the case of pressurization by the pressurized fluid. The sealing lip is thus applied to the side wall of the drainage channel at a contact pressure that is pressure-proportional to the operating pressure of the fluid. As a result, reliable sealing of the drainage channel with respect to the pressurized fluid is achieved irrespective of an operating pressure prevailing in the fluid.

According to the invention, the seal is designed as a double concentric seal. In this case, the two sealing elements of the seal are thus arranged at the same height in the direction of the longitudinal axis of the filter element.

According to the invention, the radially inner sealing element preferably comprises the sealing lip. This results in particularly simple mounting of the filter element in the filter housing of a fluid filter. The effects of a swelling-related increase in volume of the radially outer oil seal are reduced compared with an inner oil seal. Removal of the filter element from the sealing seat thereof inside a filter housing of a fluid filter is thus impeded to a lesser extent. In the case of the radially outer oil seal, it is possible to compensate for manufacturing tolerances of the sealing connecting piece or of the fluid channel on the filter housing side more reliably than is the case for an oil seal that is arranged on the inside of the sealing connecting piece in the radial direction.

According to the invention, the cross section of the sealing lip of one of the sealing elements may taper toward the free end thereof. This can improve the response characteristic of the sealing lip to operating pressure fluctuations of the fluid flowing through the filter element.

According to the invention, the sealing element comprising the sealing lip, and/or the oil seal, can be formed on the sealing connecting piece, in particular molded thereon. According to an alternative embodiment of the invention, the oil seal is formed as a component that is separate from the sealing connecting piece. In this case, the oil seal is held on or in a seal receiving structure of the sealing connecting piece. In the latter case, the oil seal may in particular be arranged in an annular groove of the sealing connecting piece, preferably with axial play.

According to the invention, the oil seal may in particular be designed as an O-ring. Cheap and pre-fabricated O-rings of this kind are commercially available in various sizes.

For the purpose of a reliable sealing ability, the oil seal may consist of a viscoplastic or rubber-elastic material.

With regard to aspects of manufacturing, it has been found to be advantageous for the sealing connecting piece to be formed by an end plate of the filter element. As a result, separate components are no longer required, and mounting of the filter element is facilitated as a whole.

Alternatively, the sealing connecting piece may extend, in portions, into the inner cavity of the filter element in the axial direction, as a separate component. In this case, the sealing connecting piece is preferably locked or adhesively bonded to the filter element, for example an end plate or a central tube of the filter element, in order to support the filter medium.

The fluid filter according to the invention comprises a filter housing comprising an inlet for the fluid that is to be filtered and an outlet for the filtered fluid. A filter element as explained above is arranged in the filter housing, and the inner cavity of the filter element is fluidically connected to a fluid channel of the filter housing. The sealing connecting piece of the filter element extends in the axial direction into a drainage channel of the filter housing for discharging the fluid arranged in the filter housing, and (when the fluid filter is operating) closes the drainage channel in a fluid-tight manner by means of the seal that is in sealing contact on mutually facing side walls of the drainage channel in the radial direction. When the filter element is moved out of the filter housing axially, the sealing elements of the seal are automatically removed, together therewith, from the sealing seat thereof on the side walls of the drainage channel, such that a fluidic connection between the drainage channel and a clean side or an unfiltered side of the filter element is released. The unfiltered fluid arranged on the unfiltered side in the filter housing or in the filter element, and/or the filtered fluid arranged on the clean side, can thus be discharged from or conveyed out of the filter housing, in particular before the filter element is fully removed from the filter housing.

The drainage channel of the filter housing may be fluidically connected, for example, to the fuel tank in the case of a fuel filter, or to an oil sump in the case of an oil filter.

The seal or the side walls of the drainage channel may be designed such that respective fluidic connections of the drainage channel to the untreated fluid side and to the clean fluid side are released in succession when the filter element is removed. It is thus possible to largely prevent the clean fluid from mixing with the unfiltered fluid.

BRIEF DESCRIPTION OF THE DRAWINGS

Other advantages, features and details of the invention can be found in the following description, in which embodiments of the invention are explained in greater detail, with reference to the accompanying drawings. A person skilled in the art will expediently consider the features disclosed in combination in the drawing, the description and the claims also individually and combine them into useful further combinations.

DESCRIPTION OF PREFERRED EMBODIMENTS

Figure 1:
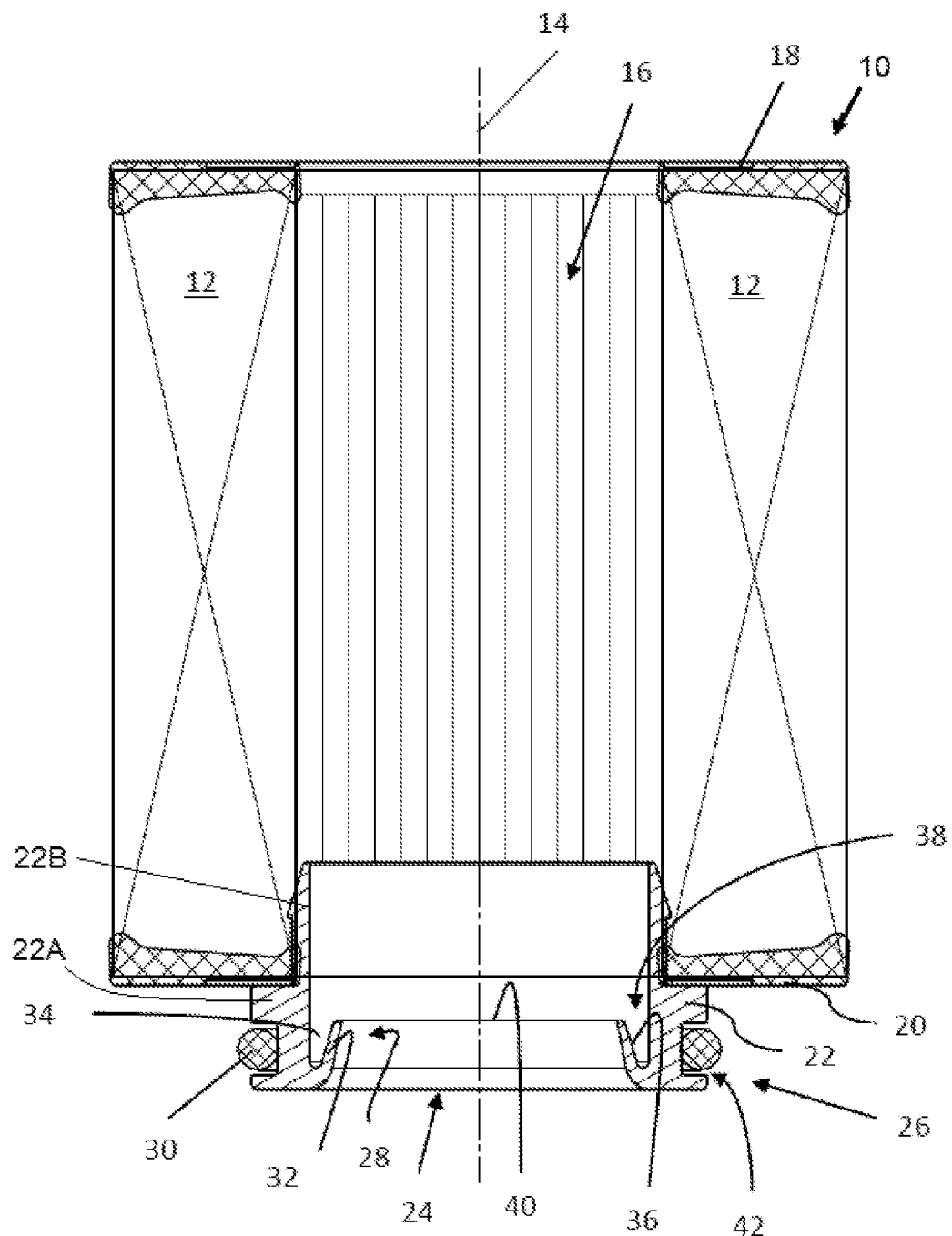
FIG. 1 is a longitudinal section of a filter element for a fluid filter, in particular an oil filter of an internal combustion engine of a motor vehicle, comprising an end-side sealing connecting piece that comprises a double concentric seal comprising a radially inner sealing element, radial in relation to the longitudinal axis of the filter element, that comprises a sealing lip, and further comprising an outer oil seal.

FIG. 1 shows a filter element 10 for filtering out contaminants contained in a fluid such as oil or fuel. The filter element 10 comprises a filter medium 12 that is arranged in an annular manner with respect to the longitudinal axis 14 of the filter element 10 and completely surrounds an axially extending inner cavity 16 of the filter element 10. As shown in FIG. 1, the filter medium 12 can be designed as a stellate folded bellows and consist of a nonwoven fabric for example. The filter medium 12 is arranged so as to be retained between an upper and a lower end plate 18, 20 of the filter element 10. For reasons of tightness, the filter medium 12 may in particular be embedded in the material of the end plates or adhesively bonded to the two end plates 18, 20. The fluid to be filtered can pass through the filter medium 12 in a radial direction, from the outside to the inside.

The filter element 10 comprises a sealing connecting piece 22 at one end. The sealing connecting piece 22 is provided with an opening 24 for fluidically connecting the inner cavity 16 of the filter element 10 to a fluid channel of a filter housing that will be described in the following in conjunction with FIG. 2. A seal, denoted as a whole by 26, is arranged on the sealing connecting piece 22. The seal 26 comprises a radially inner sealing element 28 and a radially outer sealing element 30. As shown by way of example in FIG. 1, the seal 26 can be designed as what is known as a double concentric seal. The sealing connecting piece 22 has a tubular annual projection 22A arranged on the axially outer surface of the bottom end plate 20. A first portion of the tubular annual projection 22A is arranged on the axially outer surface of the bottom end plate 20 and projects axially outwardly away from filter element. A second portion 22B of the tubular annual projection 22A projects axially inwardly through the lower end plate 20 into the interior cavity 16. The tubular annual projection 22A has a central opening 24 extending from the axially outer end of the first portion of the tubular annual projection 22A, extending through the second portion 22B of the tubular annual projection and opening in the interior cavity 16 of the filter medium 12.

The radially inner sealing element 28 comprises an elastically deformable sealing lip 32. The sealing lip 32 is formed on the sealing connecting piece 22 and may consist of a plastics material such as polyurethane or another polyolefin. In FIG. 1, the sealing lip 32 is shown in the unstressed state thereof and extends radially away from the sealing connecting piece 22 toward the longitudinal axis 14 of the filter element 10, and in addition axially toward the filter medium 12. In other words, the sealing lip 32 extends axially away from the sealing connecting piece 22 and toward the upper end plate 18 of the filter element 10. The sealing lip 32 thus forms, together with the sealing connecting piece, a pocket denoted by 34. A surface region of the sealing lip 32 that faces the pocket 34 is denoted by 36. The pocket 34 comprises a pocket opening 38 that faces the upper end plate 18. The cross section of the sealing lip 32 may taper toward the free end 40 thereof, as shown in FIG. 1.

The radially outer sealing element 30 is formed as an oil seal, in this case in the form of an O-ring. The O-ring is designed as a component that is separate from the sealing connecting piece 22 and is arranged, with axial play, in a seal holder structure 42 of the sealing connecting piece 22 that is designed as an annular groove. The oil seal does not comprise a sealing lip.

By way of example, the sealing connecting piece 22 is designed as a component that is separate from the lower end plate 20 and extends in the axial direction into the inner cavity 16 of the filter element 10. In order to be secured in place axially, the sealing connecting piece 22 may be locked to the filter element 10 and/or adhesively bonded to the filter element 10. According to an alternative embodiment that is not shown in greater detail in the drawings, the sealing connecting piece 22 may also be formed in one piece with the lower end plate of the filter element.

Figure 2:
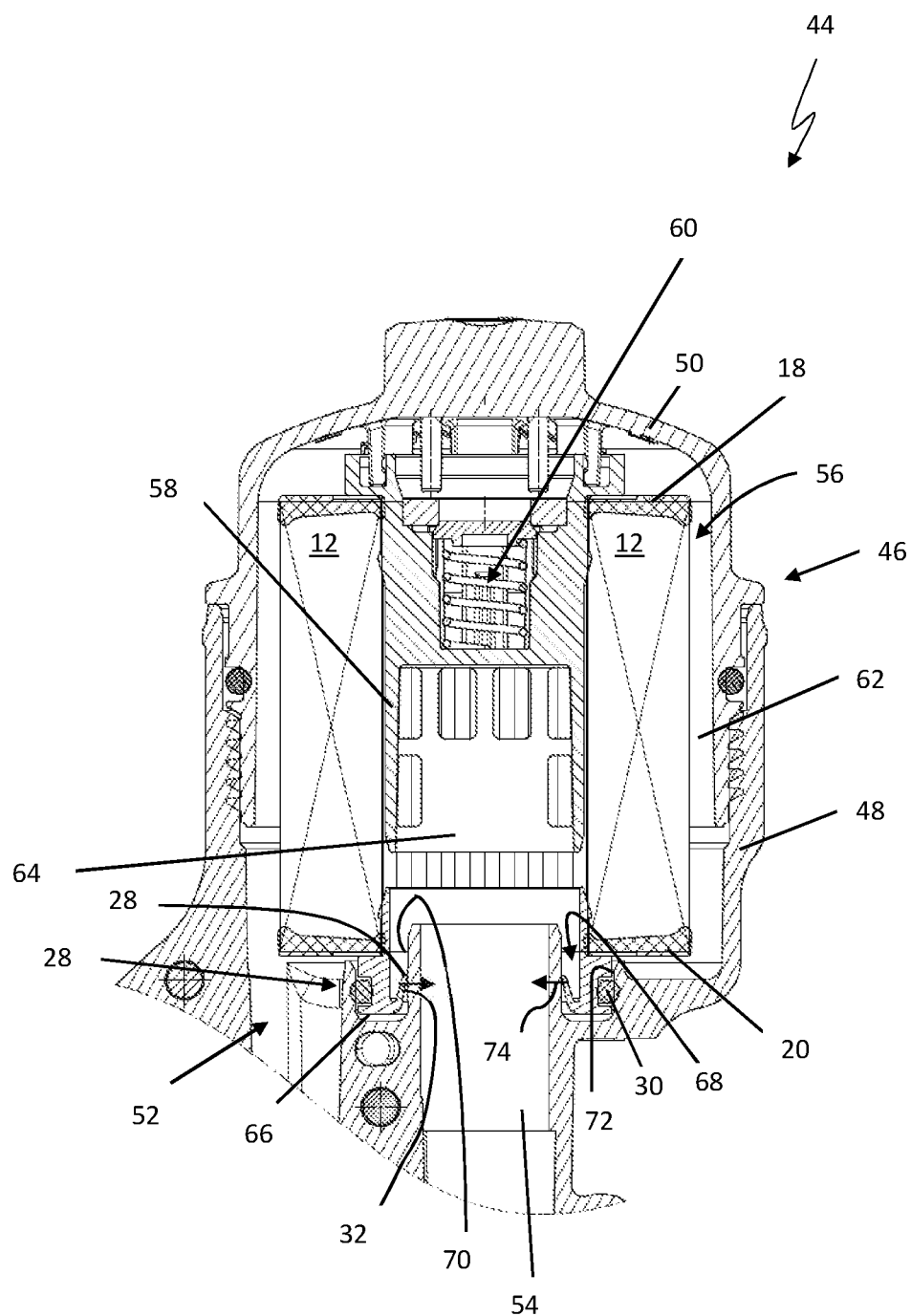
FIG. 2 is a longitudinal section of a detail of a fluid filter comprising a filter element according to FIG. 1.

FIG. 2 is a longitudinal section of a detail of a fluid filter 44, in this case an oil filter. The fluid filter 44 comprises a filter housing 46 having a filter pot 48 and a filter cover 50. A filter element 10 described above in connection to FIG. 1 is arranged in its operating position in the filter housing 46.

The filter housing 46 has an inlet 52 for the fluid to be filtered and a fluid channel 54 that forms an outlet for the filtered fluid. An axial opening 56 of the filter pot is used for inserting and removing the filter element 10 and is closed by means of the filter cover 50.

The filter cover 50 comprises a retaining or mounting pin 58 that extends axially into the inner cavity 16 of the filter element 10 and is used for radially internally supporting the filter medium 12. This prevents the filter medium 12 from collapsing during operation. The filter element 10 is frictionally held on the mounting pin 58. The mounting pin 58 may comprise an integrated filter element bypass valve 60 for the fluid to be filtered. The upper end plate 18 of the filter element is in sealing contact with a base portion 62 of the mounting pin 58 in the axial direction.

An unfiltered fluid side fluidically upstream of the filter medium 12 is denoted by 62. A clean fluid side, in this case comprising the inner cavity 16 of the filter element 10, fluidically downstream of the filter medium 12 is denoted by 64.

The outlet side of the inner cavity 16 of the filter element 10 is fluidically connected, by means of the sealing connecting piece 22, to the fluid channel 54 (outlet) of the filter housing 46 for the filtered fluid.

For the purpose of servicing, the filter housing 10 also comprises (in addition to the fluid channel 54) an outflow or drainage channel 66 for the fluid arranged in the filter housing. The drainage channel 66 comprises a (coaxial) annular opening 68, and, for drawing-related reasons, only a detail of the channel is shown.

In the operating state of the fluid filter 44, the sealing connecting piece 22 of the filter element extends over the annular opening 68 in a sealing manner and into the drainage channel 66. The radially inner sealing lip 32 of the seal 26 is in sealing contact with a radially inner side wall 70 of the drainage channel 66. The radially outer sealing element 30, i.e. the oil seal, is in sealing contact with an outer side wall 72 of the drainage channel 66. As a result, the clean fluid side 64 and the unfiltered fluid side 62 of the filter element 10 or of the fluid filter 44, as well as the drainage channel 66, are sealed in a fluid-tight manner with respect to one another. The fluid is prevented from flowing out via the drainage channel 66.

During operation of the fluid filter 44, an operating pressure is applied to the fluid conveyed through the fluid filter 44. As a result, during operation, the fluid exerts a radially acting force 74 on the surface region 36 of the sealing lip 32 of the inner sealing element 28 that comes into contact with the fluid, and by means of this force 74 the sealing lip 32 is pressed, in a pressure-proportional manner, against the inner side wall 70 of the drainage channel 66. As the operating pressure of the fluid increases, the sealing lip 32 is thus in contact with the inner side wall 70 of the outflow channel at an increased contact pressure (not shown), and vice versa. This dynamic sealing behavior of the radially inner sealing element 28 ensures particularly reliable sealing of the unfiltered fluid side 62 with respect to the clean fluid side 64 or the drainage channel 66 of the filter housing 46.

During operation of the fluid filter 44, the fluid flows into the filter housing 46 through the inlet 52. The fluid flows through the filter medium 12 of the filter element 10 in the radial direction, from outside to inside, and thus reaches the inner cavity 16 of the filter element 10. On the clean side, the filtered fluid flows in the axial direction in the fluid channel 54 of the filter housing 46 and is conveyed out of the filter housing 46 via the channel for further use.

In order to remove the filter element 10, the filter cover 50 is removed from the filter pot 48 and the filter element 10 is removed, in the axial direction and via the annular opening 56 of the filter housing 46, from the sealing seat thereof on the filter pot 48. In the process, the radially inner sealing element 28 of the sealing connecting piece 22 releases the inner cavity 16 of the filter element 10 toward the drainage channel 66. At the same time, the radially outer oil seal element (30) of the sealing connecting piece 22 releases the unfiltered fluid side 62, together with the unfiltered fluid located therein, to the drainage channel 66 of the filter housing 46. The fluid located in the filter housing 46 and in the filter element 10 can thus flow downward, out of the filter housing 46, via the drainage channel 66. The (largely) emptied filter element 10 can subsequently be removed from the filter housing 46 and replaced by another filter element 10.

What is claimed is:

1. A filter element for filtering a fluid, the filter element comprising:
a filter medium surrounding an inner cavity, wherein the inner cavity extends in an axial direction along a longitudinal axis of the filter element;
an upper end plate arranged on an upper axial end of the filter medium; a lower end plate arranged on a lower axial end of the filter medium; an annular sealing connecting piece arranged on an axially outer surface of the bottom end plate, the annular sealing connecting piece comprising:
a tubular annular projection arranged on the axially outer surface of the bottom end plate, the tubular annular projection having:
a first portion of the tubular annular projection arranged on the axially outer surface of the bottom end plate and projecting axially outwardly away from filter element at the bottom end plate to an axially outer end of the tubular annular projection;
a second portion of the tubular annular projection projecting axially inwardly through the lower end plate into the inner cavity of the filter medium;
wherein the tubular annular projection has a central opening extending from the axially outer end of the first portion of the tubular annular projection, extending through the second portion of the tubular annular projection and opening in the inner cavity of the filter medium, the central opening configured to fluidically connect the inner cavity to a fluid channel of a filter housing;
a double concentric seal arranged on the first portion of the tubular annular projection and spaced axially outwardly away from the bottom end plate, the double concentric seal comprising:
a seal holder structure formed on a radially outer surface of the first portion of the tubular annular projection;
a radially outer sealing element arranged in the seal holder structure, configured as an oil seal;
a radially inner sealing element formed on and connected to the axially outer end of the first portion of the tubular annular projection and having an elastically deformable sealing lip projecting into the central opening in a direction towards the filter medium,
wherein the radially outer sealing element and the radially inner sealing element are both positioned between the axially outer end of the first portion of the tubular annular projection and the bottom end plate and are configured to seal against radially opposite sidewalls of an annular outflow drainage channel of the filter housing;
wherein the elastically deformable sealing lip is configured to be pressed and seal, assisted by a force generated by a fluid pressure in operation of the filter element, against a respective one of the side walls of the annular outflow drainage channel side walls of the drainage channel.

2. The filter element according to claim 1, wherein the sealing element comprising the elastically deformable sealing lip is molded to the annular sealing connecting piece.

3. The filter element according to claim 1, wherein the oil seal is formed on the annular sealing connecting piece.

4. The filter element according to claim 3, wherein the oil seal is molded to the annular sealing connecting piece.

5. The filter element according to claim 1, wherein the sealing element comprising the elastically deformable sealing lip and the oil seal are formed on the annular sealing connecting piece.

6. The filter element according to claim 5, wherein the sealing element comprising the elastically deformable sealing lip and the oil seal are molded to the annular sealing connecting piece.

7. The filter element according to claim 1, wherein the annular sealing connecting piece is locked to the lower end plate of the filter element.

8. The filter element according to claim 1, wherein the seal holder structure is an annular groove formed on the radially outer surface of the first portion of the tubular annular projection.

9. The filter element according to claim 1, wherein the oil seal is an O-ring.

10. A fluid filter comprising: a filter housing comprising an inlet for a fluid to be filtered, a fluid channel forming an outlet for filtered fluid, and an annular outflow drainage channel configured to discharge fluid located in the filter housing;
a filter element arranged in the filter housing, wherein the filter element comprises:
a filter medium surrounding an inner cavity, wherein the inner cavity extends in an axial direction along a longitudinal axis of the filter element;
an upper end plate arranged on an upper axial end of the filter medium; a lower end plate arranged on a lower axial end of the filter medium;
an annular sealing connecting piece arranged on an axially outer surface of the bottom end plate, the annular sealing connecting piece comprising:
a tubular annular projection arranged on the axially outer surface of the bottom end plate, the tubular annular projection having:
a first portion of the tubular annular projection arranged on the axially outer surface of the bottom end plate and projecting axially outwardly away from filter element at the bottom end plate to an axially outer end of the tubular annular projection;
a second portion of the tubular annular projection projecting axially inwardly through the lower end plate into the inner cavity of the filter medium;
wherein the tubular annular projection has a central opening extending from the axially outer end of the first portion of the tubular annular projection, extending through the second portion of the tubular annular projection and opening in the inner cavity of the filter medium, the central opening configured to fluidically connect the inner cavity to a fluid channel of a filter housing;
a double concentric seal arranged on the first portion of the tubular annular projection and spaced axially outwardly away from the bottom end plate, the double concentric seal comprising:
a seal holder structure formed on a radially outer surface of the first portion of the tubular annular projection;
a radially outer sealing element arranged in the seal holder structure, configured as an oil seal;

a radially inner sealing element formed on and connected to the axially outer end of the first portion of the tubular annular projection and having an elastically deformable sealing lip projecting into the central opening in a direction towards the filter medium, wherein the radially outer sealing element and the radially inner sealing element are both positioned between the axially outer end of the first portion of the tubular annular projection and the bottom end plate and are configured to seal against radially opposite sidewalls of an annular outflow drainage channel of the filter housing;

wherein the double concentric seal closes fluid-tightly the annular outflow drainage channel of the filter housing, wherein the elastically deformable sealing lip is configured to be pressed and seal, assisted by a force generated by a fluid pressure in operation of the filter element, against a respective one of the side walls of the annular outflow drainage channel side walls of the drainage channel.

\* \* \* \* \*